US012659221B2

(12) United States Patent
Albeladi et al.

(10) Patent No.: US 12,659,221 B2
(45) Date of Patent: Jun. 16, 2026

(54) SYSTEM AND METHOD FOR RETRIEVING ALARM DATA FROM AN ISOLATED NETWORK

(71) Applicant: SAUDI ARABIAN OIL COMPANY, Dhahran (SA)

(72) Inventors: Rakan Hamed Albeladi, Dhahran (SA); Sami Abdulrahman Alamer, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 262 days.

(21) Appl. No.: 18/482,221

(22) Filed: Oct. 6, 2023

(65) Prior Publication Data

US 2025/0119344 A1     Apr. 10, 2025

(51) Int. Cl.
| | |
|---|---|
| *H04L 41/0681* | (2022.01) |
| *H04L 41/0604* | (2022.01) |
| *H04L 41/0695* | (2022.01) |
| *H04W 4/14* | (2009.01) |

(52) U.S. Cl.
CPC ...... *H04L 41/0695* (2013.01); *H04L 41/0681* (2013.01); *H04W 4/14* (2013.01)

(58) Field of Classification Search
CPC ............. H04L 41/0695; H04L 41/0681; H04L 41/0604; H04W 4/14
See application file for complete search history.

(56) References Cited

U.S. PATENT DOCUMENTS

| | | | |
|---|---|---|---|
| 7,062,358 B2 | 6/2006 | Larsson et al. | |
| 8,466,783 B2 | 6/2013 | Lagnelov et al. | |
| 2007/0177982 A1* | 8/2007 | Cadet | F04B 49/08 |
| | | | 417/19 |
| 2018/0115528 A1* | 4/2018 | Rotvold | H04L 9/0827 |
| 2021/0266290 A1* | 8/2021 | Batouq | H04L 63/029 |
| 2024/0402688 A1* | 12/2024 | Srinivasan | G05B 19/4186 |

FOREIGN PATENT DOCUMENTS

| | | |
|---|---|---|
| CN | 102223247 A | 10/2011 |
| CN | 107196804 A | 9/2017 |
| CN | 107424391 A | 12/2017 |
| CN | 110505102 A | 11/2019 |
| CN | 112988509 A | 6/2021 |
| CN | 114089704 A | 2/2022 |

OTHER PUBLICATIONS

VTscada, "SCADA Alarm and Event Management", archived Jun. 3, 2023 at the Wayback Machine, https://web.archive.org/web/20230603175516/https://www.vtscada.com/alarm-and-event-management/ (Year: 2023).*

* cited by examiner

*Primary Examiner* — Lesa M Kennedy
(74) *Attorney, Agent, or Firm* — Vorys, Sater, Seymour and Pease LLP

(57) ABSTRACT

System and methods are disclosed herein for retrieving alarm data from an isolated network without compromising its security integrity. In an example, a data diode can be used to couple a first network and a second network. An alarm transmitter can be coupled to the first network, and an alarm receiver can be coupled to the second network. The alarm transmitter that can be operable to receive alarm data and communicate the alarm data by the data diode to the alarm receiver. The alarm receiver can be operable to output an alert based on the analysis of the alarm data.

17 Claims, 6 Drawing Sheets

SYSTEM AND METHOD FOR RETRIEVING ALARM DATA FROM AN ISOLATED NETWORK

FIELD OF THE DISCLOSURE

This disclosure relates generally to maintenance of a pipeline network, and more specifically, retrieving alarm data from an isolated network without compromising its security integrity.

BACKGROUND OF THE DISCLOSURE

A pipeline network is monitored to ensure safe and efficient operations. The network can be composed of various components and includes an interconnected system of pipelines designed to transport a commodity (e.g., fluids, gasses, by-products, or other materials, etc. over various distances). Beyond the physical pipelines (or pies), the network can include various components such as pumps or compressors (to move the commodity), valves (to control flow), meters (to measure flow rates), sensors (to monitor conditions), safety devices (like pressure relief mechanisms), electrical lines and substations, to name a few. The pipeline network can span a range of scales, from localized networks within a facility to expansive systems that cross regional or national boundaries.

Hydrocarbon Management Department (HMD) planners are delegated the duty of monitoring and controlling pipeline operations. HMD planners (or an HMD department) are responsible for overseeing operational and maintenance points of the pipelines to reduce or prevent flow disruptions and guarantee safety (of the pipeline as well as the personnel). HMD planners use a centralized control system (CDS) to see real-time data from points across the pipelines. For example, the CDS is used to receiver or gather information from sensors and devices placed throughout the pipeline network. Often such systems utilize Supervisory Control and Data Acquisition (SCADA), which is an architecture that allows for process supervisory management and data collection. The CDS includes a combination of hardware and software components for collecting, analyzing, and displaying real-time data from the maintenance and operational points, which can be referred to herein as maintenance data and operational data, respectively.

To mitigate digital threats to the pipeline network, the CDS is physically separated from the outside world, for example, Internet, corporate networks, or other systems, which can be referred to herein as "outside network." This is because operational information is critical and sensitive and mitigating compromise of this data is paramount of pipeline network operations and safety. Physical separation refers to the practice of keeping two or more networks or systems completely isolated from each other by ensuring that the network or systems do not share any connection (e.g., communication channel), common hardware, cabling, and/or networking devices. Thus, HMD do not permit other entities to access the operational data stored on the CDS. Standards have been implemented by HMD to ensure segregation between an Industrial Control System (ICS) and the outside network. The ICS can encompass one or more control systems and associated instrumentation, which can include devices, systems, networks, and controls used to operate and/or automate industrial processes. In some examples, the ICS can include a control and data system (such as the CDS). The standards further extend the principle of physical separation to ICS systems that are geographically distributed. For example, if an entity has multiple operational sites, and even if these sites are miles apart, the ICS at each site should be separated from each other and the outside network to ensure no cross-contamination of potential cyber threats. Physically separating the ICS from other ICS and the outside network is a strong deterrent against cyber risks, such as unauthorized access, cyber threats (e.g., malware, ransomware, phishing attacks, etc.), and data corruption.

Because of this segregation, when an HMD planner receives a maintenance alarm (indicating a required pipeline maintenance), the HMD planner has to manually (e.g., over email, via a text, call, etc.) notify a pipeline department, which can include a maintenance team/department. For example, when the maintenance alarm is received, the HMD planner may notify (e.g., via email) a field coordinator whose purpose is to notify the pipeline department (e.g., via email as well). The pipeline department can manage the physical infrastructure of the pipeline network, including, but not limited to, construction, repair, and maintenance, to name a few. The pipeline department acts on the maintenance alarm in response to receiving it from the HMD planner, or field coordinator, in other examples, A large number of maintenance alarms are often generated daily requiring investigation to ensure safety and operations of the pipeline network. Because of the overwhelming number of maintenance alarms, HMD planners rely on their judgment using their experience as to which maintenance alarms field coordinators or the pipeline department should be notified. HMD planners make their notification decision based on alarm criticality and frequency as to which alarms should be escalated to the field coordinator and when to make the escalation. Generally, daily, weekly and/or monthly reports are produced and are used to compare alarm system performance with company established key performance indicators (KPI's) and identify the most frequent alarms, which can be referred to as "critical alarms." HMD engineers periodically send emails to the pipeline department to check the status of resolution. The HMD planners bottlenecks the maintenance alarm reporting process which increases a likelihood of pipeline failure or downtime, and safety risk to personnel. Furthermore, HMD planners use their judgment to identify the most critical alarms, which can result in missed maintenance alarms that should have been flagged as critical but have not, further increasing the risk of pipeline failure, downtime, and safety of personnel. Additionally, because the ICS is segregated from the outside network, and thus a corporate network, the pipeline department is unable to access the maintenance alarms for evaluation, which in some instances, are better suited than HMD planners.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment, a system can include a data diode that can couple a first network and a second network, an alarm transmitter that can be coupled to the first network, and an alarm receiver that can be coupled to the second network. The alarm transmitter can be operable to receive alarm data and communicate the alarm data using the data diode to the alarm receiver, and the alarm receiver can be operable to output an alert based on the analysis of the alarm data.

In another embodiment, a method can include segregating, at a Supervisory Control and Data Acquisition (SCADA) system, maintenance alarms and operational alarms into respective first and second databases. The SCADA system can be coupled to a first network. The method can include configuring the first network with an alarm transmitter to provide one or more maintenance alarms of the maintenance alarms from the first database of the SCADA system, configuring a second network with an alarm receiver to receive the one or more maintenance alarms and output an alert based on the alarm data, and coupling the first network to the second network with a data diode. The data diode being used to provide the one or more maintenance alarms from the first network to the second network and block any data from being provided from the second network to the first network.

In a further embodiment, a system can include a first computing platform coupled to a SCADA system on a first network to receive alarm data from an alarm database, and a second computing platform on a second network, the first network being coupled to the second network by a data diode so that the first computing platform can communicate the alarm data to the second computing platform to output an alert based on the alarm data.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
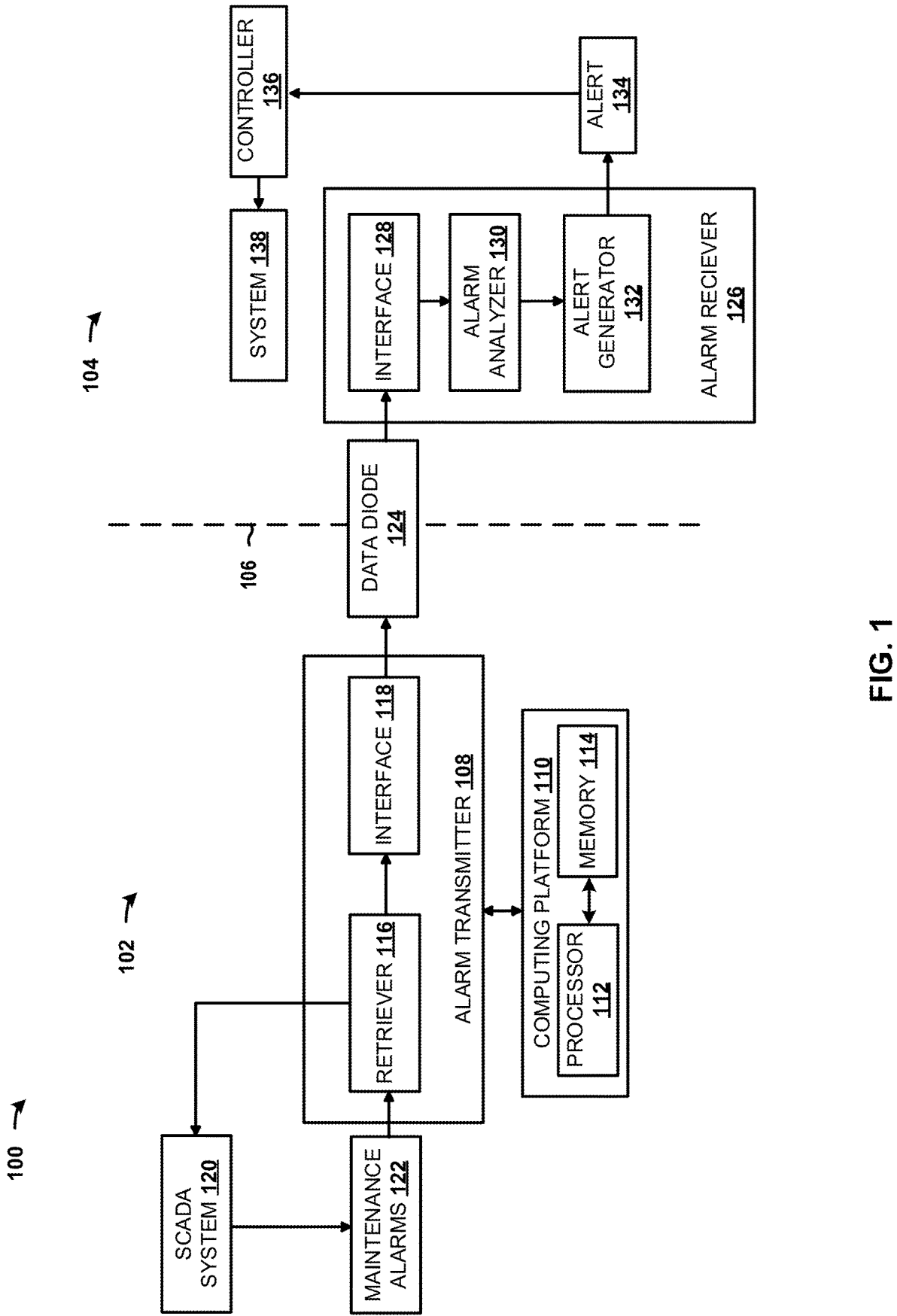
FIG. 1 is an example of an alarm retrieval system.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments of the present disclosure relate to retrieving alarms, for example, maintenance alarms (alarm data) from an isolated network without compromising its security integrity. Because an Industrial Control System (ICS) is segregated from an outside network (or system), a pipeline department is unable to access maintenance alarms directly and rely on Hydrocarbon Management Department (HMD) planners for this information. Examples are described herein for permitting maintenance personnel (the pipeline department) to access the maintenance alarms while protecting ICS from cyber threats by maintaining a physical separation between the ICS and the outside network.

FIG. 1 is an example of an alarm retrieval system 100. Examples are disclosed herein in which the system 100 is used for maintenance in the oil and/or gas industry, but the system 100 can be used in other industries as well, as power plants, power generation and distribution, manufacturing, industrial production, transportation (e.g., railways, aviation, shipping), mining and metallurgy, agriculture, telecommunications, healthcare, real estate and building management, forestry, environmental monitoring, and retail and logistics to name a few.

The system 100 can be used to retrieve maintenance alarms from a network or system 102 that has been segregated from another network or system 104, which can be referred to herein as an outside network (or system). In some examples, the network 104 is a corporate network, but can include other networks, for example, cellular networks, wired networks, and/or wireless networks. In some examples, the network 102 can be implemented as an HMD network. In the example of FIG. 1, the physical separation of the networks 102 and 104 is shown with a dashed-lined and can be referred to with reference numeral 106. In some examples, the physical separation 106 is by one or more firewalls. Each of the networks 102 and 104 can include respective firewalls, which can be implemented as software, hardware, and/or a combination thereof. For clarity and brevity purposes, the firewalls have been omitted from FIG. 1. Because the networks 102 and 104 are separated, a cyber threat originating on the network 104 would not undermine the security of the network 102. In some examples, the network 102 is implemented as part of a pipeline network, for example, as disclosed herein.

The system 100 includes a maintenance alarm transmitter 108. The alarm transmitter 108 can be implemented using one or more modules, shown in block form in the drawings in the example of FIG. 1. The one or more modules can be in software or hardware form, or a combination thereof. In some examples, the aggregator can be implemented as machine-readable instructions for execution on a computing platform 110, as shown in FIG. 1. The computing platform 110 can include any computing device, for example, a desktop computer, a server, a controller, a blade, a mobile phone, a tablet, a laptop, a personal digital assistant (PDA), or other types of portable (or stationary) devices. The computing platform 110 can include a processor 112 and a memory 114. By way of example, the memory 114 can be implemented, for example, as a non-transitory computer storage medium, such as volatile memory (e.g., random access memory), non-volatile memory (e.g., a hard disk drive, a solid-state drive, a flash memory, or the like), or a combination thereof. The processor 112 can be implemented, for example, as one or more processor cores. The memory 114 can store machine-readable instructions (e.g., alarm transmitter 108) that can be retrieved and executed by the processor 112. Each of the processor 112 and the memory 114 can be implemented on a similar or a different computing platform.

In some examples, the alarm transmitter 108 can be implemented as a PI-server. A PI-server, as disclosed herein, can be implemented as software, hardware, and/or as a combination thereof. For example, a PI software development kit, such as from OSIsoft® can be used to implement a PI-server. In some examples, PI Vision or PI AlarmView software or application from OSIsoft® can be used to visualize maintenance alarms and failures. The alarm transmitter 108 can be implemented on an ICS-side and thus connected to the network 102. In some examples, the ICS is implemented as a CDS. For example, the alarm transmitter 108 can be connected to network 102 to connect to a Supervisory Control and Data Acquisition (SCADA) system 120 of the ICS. In some examples, the SCADA system 120 is an operational control center (OCC) SCADA system. In the example of FIG. 1, the system 100 includes the SCADA system 120, in other examples, the SCADA system 120 is separate from the system 100, as shown in FIG. 1.

The alarm transmitter 108 can communicate with the SCADA system 120 to receive (or collect) one or more maintenance alarms 122 for the pipeline network. The maintenance alarms 122 can be generated by the SCADA system 120, in other examples, by a different system, device, or apparatus of the ICS. The maintenance alarms 122 can be stored in memory of the SCADA system 120. In some examples, the maintenance alarms can be stored in a respective database of the SCADA system 120 separate from operational alarms, which can be stored in a corresponding database. For example, the SCADA system 120 can segregate the maintenance and operational alarms by storing these alarms in respective databases at the SCADA system 120, which can be referred to a SCADA maintenance alarm database and a SCADA operational alarm database. The segregation can be based on segregation criteria. For example, an item description includes flow or an item name includes Xxxxx_FLOW, that means this can be interpreted as (or identified as) an operational alarm. If the item description includes in item description battery charger or an item name xxxxx_Battery, this can be interpreted as (or identified as) a maintenance alarm. Existing techniques receive all alarms at the SCADA system 120 in one database causing overloading to the SCADA system 120 and interfere with non-operational alarms. This can affect HMD planner's ability to focus to efficiently monitor a hydrocarbon network and take the required measures to avoid any catastrophic events. By segregating the maintenance and operational alarms into separate databases, the non-operational alarms can be sent automatically to whom concerns while the operational alarms can be monitored by HMD planners.

Existing techniques stored the maintenance and operational alarms in a single database at the SCADA system 120. By separating out the maintenance alarms and storing these alarms in a database separate from the operational database allows for the maintenance alarms 122 to be delivered from the network 102 to the network 104, which is physically separated from the network 102. A pipeline department can have direct access to HMD SCADA data while firewall restrictions can remain in place. The pipeline department can monitor through an interface (PI-PI interface) SCADA data from the SCADA system 120 in terms of maintenance points and HMD can evaluate the operational alarms. Because the pipeline department accesses the information directly from the SCADA system 120 eliminates interface with critical operation alarms (e.g., pipeline parameters, RTU health, class-1 valves, customer metering skids, etc.), which can require immediate attention and action.

Operational alarms can correspond to alarms that concern HMD in terms of ensuring pipeline operations within a safe range or threshold, for example, but not limited to, pressure, flow valve induction, etc. Maintenance alarms are alarms that concern maintenance of the pipeline network, for example, but not limited to, heating, ventilation and air conditioning (HVAC), scraper door opening, etc. In general, each maintenance and operational point in the SCADA system 120 can be assigned into an asset (group) and each point can have one or more sets (e.g., values) where an alarm is triggered if it reaches this value. During the configuration of any points, the SCADA system 120 can store associated historical values and alarms in a corresponding database.

A maintenance point can refer to a location or section of a pipeline of a pipeline network that is monitored for effects on a pipeline's performance or safety. These points can be associated with aspects like potential wear, corrosion, equipment health, or other factors impacting the pipeline's performance or safety. For example, sensors or site visits can be used to capture maintenance data at one or more operational points. Example sensors can include corrosion sensors, ultrasonic sensors, etc. In some examples, equipment health can be periodically tested. For instance, backup generators, standby pumps, or redundant equipment can be periodically tested and maintenance data can be sent to the CDS. By contrast, an operational point can refer to a location or section of a pipeline of a pipeline network that is involved in or supports safe operation of the pipeline network. These points can be associated, for example, with active transport, control, and monitoring of pipeline commodities (e.g., oil, gas, byproducts, etc.). Operational points can include major junctions, valves, pumps, sensors, and other equipment that, if malfunctioning, could directly impact a safety, efficiency, and/or integrity of the pipeline network. The maintenance and operational points can be evaluated to determine whether maintenance or operational action needs to be undertaken with respect to the pipeline network. For example, if maintenance is required, a maintenance alarm is generated based on the analysis of the maintenance data.

The retriever 116 of the alarm transmitter 108 can retrieve (or receive) the maintenance alarms 122 from the SCADA system and store the maintenance alarms 108 in local memory. The local memory can be the memory 114, as shown in FIG. 1. The alarm transmitter 108 can collect the maintenance alarms 122 until the maintenance alarms 122 require further evaluation. The alarm transmitter 108 can also collect the maintenance alarms 122 to create a maintenance alarm database, which can be used as a backup for other applications and systems. Each maintenance alarm 122 can identify a maintenance point (e.g., have a location identifier (ID), timestamp, sensor or device type, reading value, equipment status (e.g., failure or not), and/or other parameters (e.g., address, for example, Internet Protocol (IP) address).

The alarm transmitter 108 includes an interface 118 to permit the maintenance alarms 122 to be provided using a data diode 124 to an external system or network, such as the network 104. In some examples, the interface 118 is a PI interface. The data diode 124 can be at a hardware level to permit data flow in only direction—from the network 102 to the network 104. The interface 118 can periodically retrieve the maintenance alarms 122 from the memory 114 and provide the maintenance alarms 122 by the data diode 124 to an alarm receiver 126 implemented on the network 104, as shown in FIG. 1. In some examples, the data diode 124 is used on the ICS-side, whereas in other examples, the data diode 124 is used on a corporate-side. For example, the data diode 124 can be connected to the network 102 to receive the maintenance alarms 122, and have a physical connection to the network 104. There can be one or more networks that the maintenance alarms 122 are provided over when communicated by the data diode 124 before arriving at the alarm receiver 126.

In some examples, the alarm receiver 126 is implemented on a similar computing platform as the computing platform 110, as shown in FIG. 1. In some examples, the computing platform 110 could be implemented in a computing cloud and thus on a cloud computing architecture and the alarm receiver 126 can be implemented thereon. In such a situation, features of the computing platform could be representative of a single instance of hardware or multiple instances of hardware executing across multiple of instances (e.g., distributed) of hardware (e.g., computers, routers, memory, processors, or a combination thereof). Alternatively, the computing platform 110 could be implemented on a single dedicated server or workstation on which the alarm receiver 126 can be implemented.

The alarm receiver 126 can include an interface 128 to receive the maintenance alarms 122. The alarm transmitter 108 (e.g., a PI-server server local to the HMD network) can communicate with the alarm receiver 126 (e.g., a PI-server server local to the corporate network) using the interfaces 118 and 128. Thus, the interfaces 118 and 128 can provide an interface system (e.g., a PI-to-PI interface) over which the maintenance alarms 122 can be delivered to the network 104. While the example of FIG. 1 shows the alarm receiver 126 with a single interface, there can be any number of interfaces, each using a respective data diode similar to the data diode 124 to receive maintenance alarms (in some instances similar to the maintenance alarms 122) from any number of networks that have been segregated from other (external) networks.

In some examples, the interface 128 can provide the received maintenance alarms 122 to an alarm analyzer 130. The alarm analyzer 130 can evaluate the maintenance alarms to determine whether personnel should be alerted (e.g., to investigate or carry out maintenance associated with a location or section for which the alarm was generated). For example, the alarm analyzer 130 can determine if any of the maintenance alarms 122 are critical alarms by evaluating the maintenance alarms 122 (e.g., a measurement or sensor value) relative to a threshold or range. The alarm analyzer 130 can group or categorize the critical alarms by area, for example, by using alarm location information. In some examples, the alarm analyzer 130 can determine an overall area category performance. The pipeline network can be segregated into several areas that can be under supervision or control of different departments. Each department performance can be monitored by the alarm analyzer 130 to determine, but not limited to, how many alarm per area (department), which can correspond to the overall area category performance. In some examples, the alarm analyzer 130 can determine how frequent alarms occur per department, and how often that department exceeds a key performance indicator (KPI). In some examples, the alarm analyzer 130 can determine if a particular location or section is exhibiting a high level of critical alarms. For example, if the particular location or section has a maintenance alarm generated periodically (e.g., every hour, day, etc.) and a count of the generated maintenance alarms exceeds a threshold, as determined by the alarm analyzer 130, this can be an indication that the particular location or section requires attention or maintenance.

The alarm receiver 126 includes an alert generator 132. The alarm analyzer 130 can notify the alert generator 132 of each location or section (or address) that requires maintenance or investigation, and the alert generator 132 can output an alert 134. In some examples, the alert 134 is a short message service (SMS) message, an email, or a different type of messaging channel. In some examples, the alert generator 132 has a list of contacts (e.g., emails, phone numbers, etc.) and uses the list of contacts to send the alert 134 to devices/computers of these contacts. In some examples, the alert can be provided to a controller 136. The controller 136 can be implemented as software, hardware, or a combination thereof. The controller 136 can cause or initiate maintenance of a system 138 based on the alert 134. The system can be one of an equipment, a tool, and a device of a pipeline network. For example, the controller 136 can cause a system to initiate a cleaning procedure, which can include or cause notifying appropriate personnel. In some examples, the controller 136 can cause the pipeline department to see the alert 134 and acknowledge it through a system or application (e.g., PI AlarmView).

In some examples, the alarm transmitter 108 can provide a spreadsheet that includes the maintenance alarms 122 through the interfacing system by the data diode 124 to the alarm receiver 126. A window task scheduler can be used to open the spreadsheet, and the alarm analyzer 130 (e.g., in some examples implemented as a script) extracts data for analysis according to one or more examples, as disclosed herein. The alarm analyzer 130 can count each maintenance alarm, analyze each maintenance alarm (individually or collectively) and generate a report based on its analysis, which can be rendered on an output device, as disclosed herein.

By using the data diode 124 to provide one-way data flow from the network 102 to the network 104 maintains the physical separation of the networks 102 and 104 while permitting maintenance alarms 122 to be extracted from the network 102 without human intervention. Thus, in examples in which the network 102 is an HMD network and the network 104 is a corporate network, for example, in the oil and/or gas industry, would allow a pipeline department to receive the maintenance alarms 122 directly from the SCADA system 120 by using the alarm transmitter 108, as the alarm transmitter 108 maintains a similar maintenance alarm database as the SCADA system 120. Thus, by using the system 100, allows the pipeline department to receive the maintenance alarms 122 and not detract HMD planners from attending to operational alarms that may require immediate action. The system 100 does not jeopardize the security of the network 102 or the network's firewall of remote terminal units (RTUs) connection from penetration.

Figure 2:
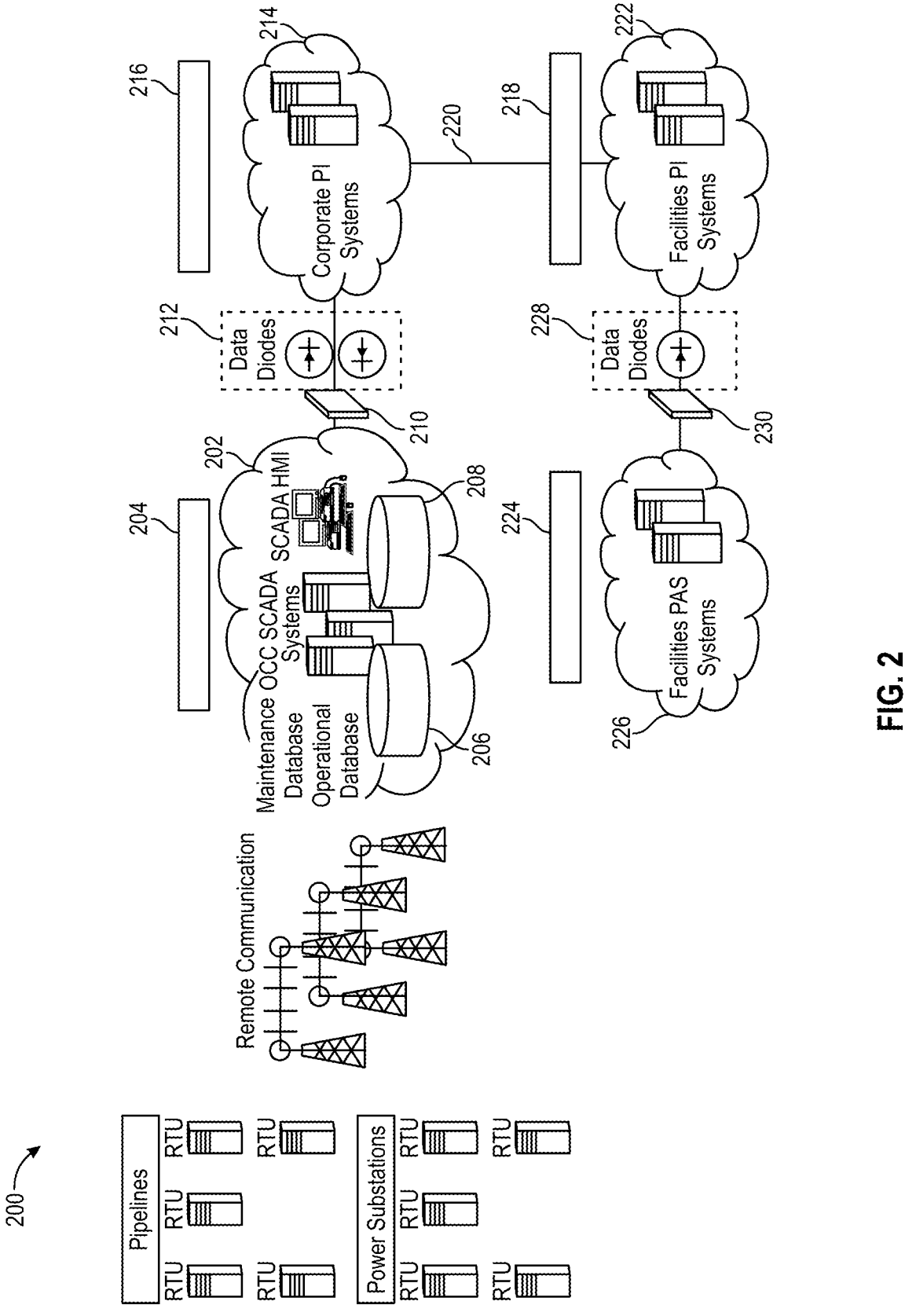
FIG. 2 is an example of a pipeline network communication system.

FIG. 2 is an example of a pipeline network communication system 200 that can be used to measure and capture operational conditions of a pipeline network, which can include pipelines (referred to in the example of FIG. 2 as "Pipelines") and power substations (referred to in the example of FIG. 2 as "Power Substations"). The system 200 includes RTU's, wherein each respective RTU is identified as "RTU" in the example of FIG. 2. Each RTU can be used to collect data or information about the pipeline network and transmit the collected data (through a remote connection) to a central control location, such as an OCC SCADA system 202. The OCC SCADA system 202 can be on an HMD network 204, which can be implemented similarly to the network 102, as shown in FIG. 1. Thus, reference can be made to the example of FIG. 1 in the example of FIG. 2. The OCC SCADA system 202 can be implemented similarly to the SCADA system 120, as shown in FIG. 1.

The OCC SCADA system 202 can include a SCADA human machine interface (HMI). The OCC SCADA system 202 can evaluate the collected data to output one or more maintenance and operational alarms, as disclosed herein. The OCC SCADA system 202 can include a maintenance alarm database 206 and an operational alarm database 208. The alarm transmitter 108, as shown in FIG. 1, can be implemented on the HMD network 204 and access maintenance alarms, such as the maintenance alarms 122, as shown in FIG. 1, from the maintenance alarm database 206. Access can include requests or retrieval operations. The HMD network 204 can include a firewall 210 or be protected by the firewall 210, which, in some examples, can be implemented as a physical device to prevent outside access by intruders. A data diode 212 can be used to provide directional access to the HMD network 204 by a corporate PI system 214 on a corporate network 216. In some examples, the data diode 212 can include a first data diode to provide directional access to the HMD network 204 from the corporate network 216, and a second data diode. The second data diode can be used to provide directional access to some data (e.g., specific data) from the corporate network 216 in order to monitor the facilities (226). The corporate network 216 can be connected to another corporate network 218, which is shown with reference numeral 220. A facilities PI system 222 can be connected to the corporate network. The corporate network 218 can be connected to a plant network 224 to which a facilities PAS system 226 is connected. A data diode as used herein can be referred to as a security device that manages physical segregation of networks. As such, the data diode can control or ensure specific data is exchanged between networks, such as disclosed herein.

The plant network 224 can be protected by a firewall 230, which can be implemented as a physical device to prevent outside access by intruders. A data diode 228 can be used to provide directional access to the plant network 224 by the facilities PI system 222 on the corporate network 218. In some examples, the data diode 212 and 228 can be implemented as the data diode 124. In some examples, the alarm receiver 126, as shown in FIG. 1, can be implemented at a corporate side (e.g., connected to the corporate network 216) or facility side (e.g., connected to the corporate network 218) and can be used to access maintenance alarms 122 from the network 204, which is physically separated from the corporate networks 216 and/or 218 according to one or more examples, as disclosed herein.

Figure 3:
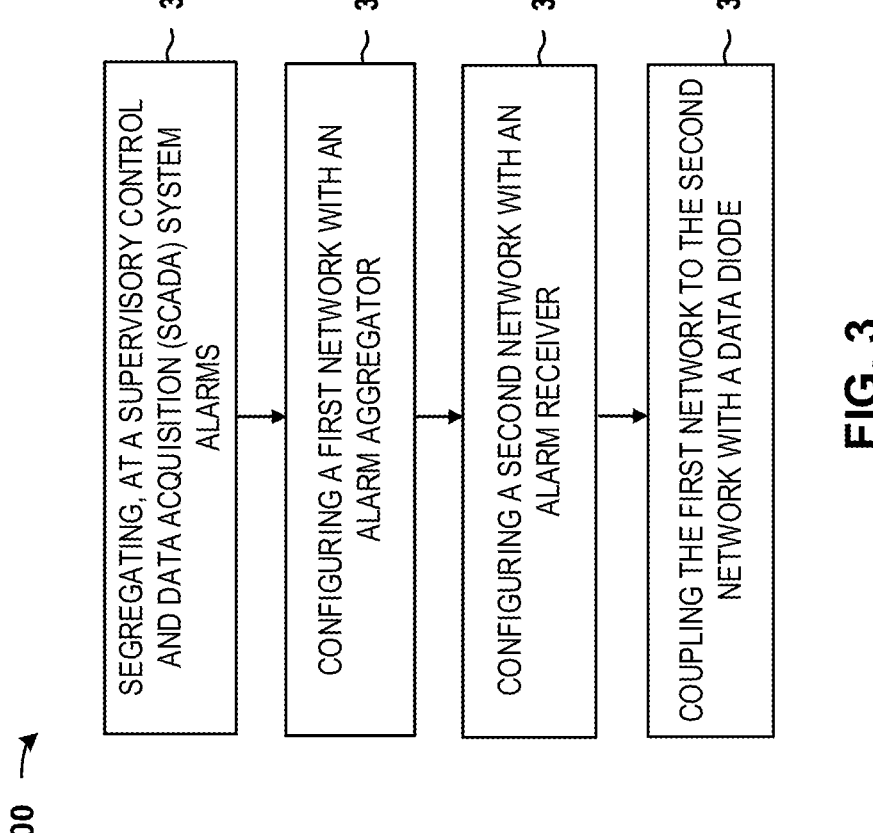
FIG. 3 is an example of a method for configuring an isolated network for alarm data access.
Figure 4:
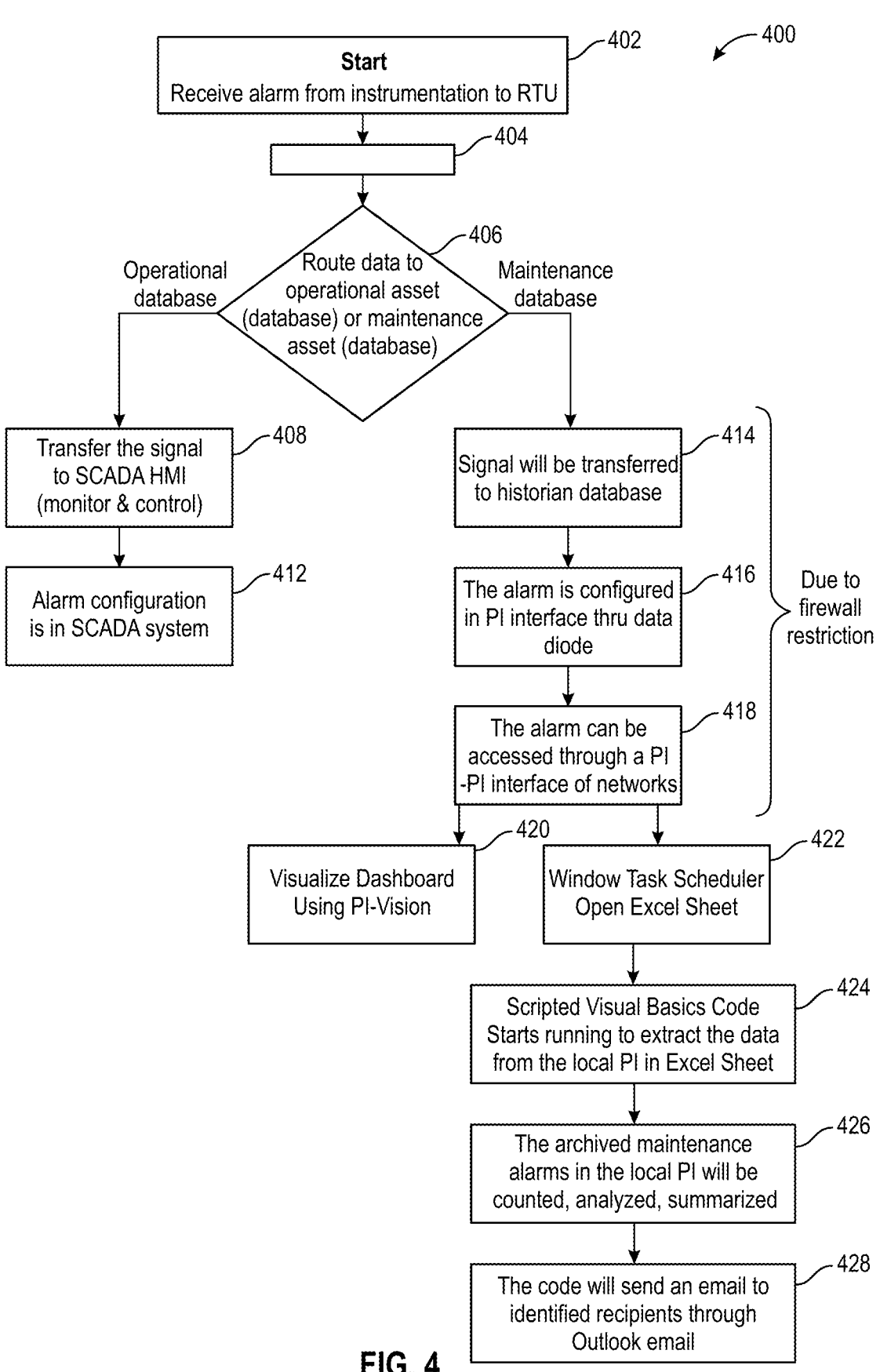
FIG. 4 is an example of another method for notifying a user (e.g., one or more personnel) of maintenance.

In view of the foregoing structural and functional features described above, example methods will be better appreciated with reference to FIGS. 3-4. While, for purposes of simplicity of explanation, the example methods of FIGS. 3-4 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 3 is an example of a method 300 for configuring an isolated network (e.g., the network 102, as shown in FIG. 1) for alarm data (e.g., maintenance alarms 122, as shown in FIG. 1) access. Thus, reference can be made to one or more examples of FIGS. 1-2 in the example of FIG. 3. The method 300 can begin at 302 by segregating, at a SCADA system (e.g., the SCADA system 120, as shown in FIG. 1), maintenance alarms and operational alarms into respective first and second databases (e.g., the databases 206 and 208, as shown in FIG. 2). The SCADA system can be coupled to the isolated network. At 304, the isolated network can be configured with an alarm transmitter (e.g., alarm transmitter 108, as shown in FIG. 1) to provide one or more maintenance alarms of the maintenance alarms from the first database of the SCADA system. At 306, another network (e.g., the network 104, as shown in FIG. 1) can be configured with an alarm receiver (e.g., the alarm receiver 126, as shown in FIG. 1) to receive the one or more maintenance alarms and output an alert (e.g., the alert 134, as shown in FIG. 1) based on the alarm data. At 308, the isolated network can be coupled to the other network with a data diode (e.g., the data diode 124, as shown in FIG. 1). The data diode can be used to provide the one or more maintenance alarms from the isolated network to the other network and block any data from being provided from the other network to the isolated network to maintain this network's isolation.

FIG. 4 is an example of a method 400 for notifying a user (e.g., one or more personnel) of maintenance. Thus, reference can be made to one or more examples of FIGS. 1-3 in the example of FIG. 4. The method 400 can begin (identified with "Start" in FIG. 4) at 402 by receiving an alarm from instrumentation of a SCADA system from RTU. In some examples, the RTU can provide the alarm, while in other instances, the RTU can provide data to the SCADA system which can analyze the data and output the alarm. At 404, the alarm is identified to determine whether the alarm is an operational alarm or a maintenance alarm. At 406, the determined alarm (and associated data in some instances) is routed to (e.g., stored in) an appropriate database. For example, at 406, the operational alarm is routed to an operational database, and the method 400 proceeds to 408. At 408, the operational alarm (e.g., in some instances a signal) is transferred to a SCADA human machine interface (HMI) for monitoring and control (e.g., by an HMD planner). At 410, one or more alarm configurations can be carried out by the SCADA system.

In examples in which the determined alarm is a maintenance alarm, the method 400 proceeds from 406 to 414. At step 414, the maintenance alarm (e.g., in some instances a signal) can be transferred from a maintenance alarm database to a database (referred to as "historian database" in FIG. 4) of an alarm transmitter (e.g., the alarm transmitter 108, as shown in FIG. 1). The SCADA system and the alarm transmitter are coupled to a first network that is isolated from an outside world (or other networks) (identified as "Due to firewall restriction" in the example of FIG. 4).

At 416, the maintenance alarm is provided using a PI-interface (e.g., the interface 118, as shown in FIG. 1) of the alarm transmitter by a data diode (e.g., the data diode 124, as shown in FIG. 1) to a PI-interface (e.g., the interface 128, as shown in FIG. 1) of an alarm receiver (e.g., the alarm receiver 126, as shown in FIG. 1). The alarm receiver is located on a different network than the alarm transmitter. At 418, the maintenance alarm can be accessed through the PI-PI interface between a corporate network and HMD network without impacting a critical infrastructure (e.g., the isolated CDS). At 420, the maintenance alarm can be visualized using a graphical user interface (GUI) through PI Vision.

In some examples, the alarm transmitter 108 can provide a spreadsheet that includes the maintenance alarm (e.g., the maintenance alarm 122, as shown in FIG. 2). At 422, a window task scheduler can be used to open the spreadsheet.

At 242, machine readable code, which can be scripted using Visual Basic, which can correspond to the alarm analyzer, or a portion thereof, can be executed (start running) extract data (e.g., the maintenance alarm) from spreadsheet. In some instances, the PI-server is the alarm receiver 126. In some instances, the interface 128 can be implemented as a stand-alone module and thus separate from the alarm receiver 126. In these examples, the stand-alone module is the PI-server and provides data to the alarm receiver 126. At 426, the alarm receiver analyzes the maintenance alarm (or alarms) and provides a report, and/or outputs an alert (e.g., the alert 134, as shown in FIG. 1) based on its analysis. At 428, the alarm receiver causes an email to be sent to recipients by invoking Microsoft Outlook® based on the alert.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 5. Thus, reference can be made to one or more examples of FIGS. 1-4 in the example of FIG. 5.

Figure 5:
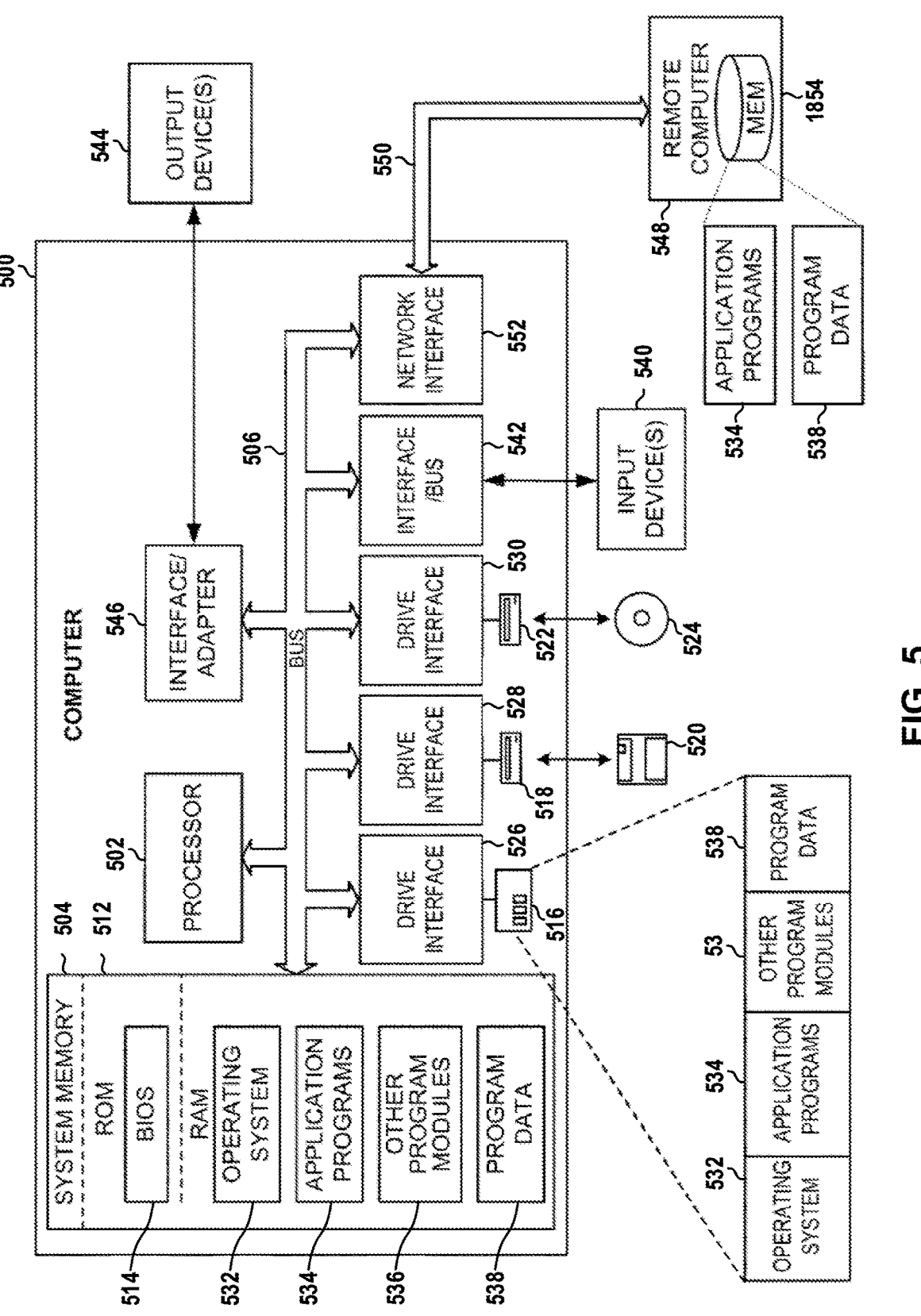
FIG. 5 depicts an example computing environment that can be used to perform methods according to an aspect of the present disclosure.

In this regard, FIG. 5 illustrates one example of a computer system 500 that can be employed to execute one or more embodiments of the present disclosure. Computer system 500 can be implemented on one or more general purpose networked computer systems, embedded computer systems, routers, switches, server devices, client devices, various intermediate devices/nodes or standalone computer systems. Additionally, computer system 500 can be implemented on various mobile clients such as, for example, a personal digital assistant (PDA), laptop computer, pager, and the like, provided it includes sufficient processing capabilities.

Computer system 500 includes processing unit 502, system memory 504, and system bus 506 that couples various system components, including the system memory 504, to processing unit 502. Dual microprocessors and other multiprocessor architectures also can be used as processing unit 502. System bus 506 may be any of several types of bus structure including a memory bus or memory controller, a peripheral bus, and a local bus using any of a variety of bus architectures. System memory 504 includes read only memory (ROM) 510 and random access memory (RAM) 512. A basic input/output system (BIOS) 514 can reside in ROM 512 containing the basic routines that help to transfer information among elements within computer system 500.

Computer system 500 can include a hard disk drive 516, magnetic disk drive 518, e.g., to read from or write to removable disk 520, and an optical disk drive 522, e.g., for reading CD-ROM disk 524 or to read from or write to other optical media. Hard disk drive 516, magnetic disk drive 518, and optical disk drive 522 are connected to system bus 506 by a hard disk drive interface 526, a magnetic disk drive interface 528, and an optical drive interface 530, respectively. The drives and associated computer-readable media provide nonvolatile storage of data, data structures, and computer-executable instructions for computer system 500. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and disclosed herein. A number of program modules may be stored in drives and RAM 510, including operating system 532, one or more application programs 534, other program modules 536, and program data 538. In some examples, the application programs 534 can include one or more modules (or block diagrams), or systems, as shown and disclosed herein. Thus, in some examples, the application programs 534 can include the maintenance alarm transmitter 108 or the alarm receiver 126, as shown in FIG. 1. A separate computing system such as the computing system 500 can be used for implementing the alarm transmitter 108 and the alarm receiver 126.

A user may enter commands and information into computer system 500 through one or more input devices 540, such as a pointing device (e.g., a mouse, touch screen), keyboard, microphone, joystick, game pad, scanner, and the like. These and other input devices are often connected to processing unit 502 through a corresponding port interface 542 that is coupled to the system bus, but may be connected by other interfaces, such as a parallel port, serial port, or universal serial bus (USB). One or more output devices 544 (e.g., display, a monitor, printer, projector, or other type of displaying device) is also connected to system bus 506 via interface 546, such as a video adapter.

Computer system 500 may operate in a networked environment using logical connections to one or more remote computers, such as remote computer 548. Remote computer 548 may be a workstation, computer system, router, peer device, or other common network node, and typically includes many or all the elements described relative to computer system 500. The logical connections, schematically indicated at 550, can include a local area network (LAN) and a wide area network (WAN). When used in a LAN networking environment, computer system 500 can be connected to the local network through a network interface or adapter 552. When used in a WAN networking environment, computer system 500 can include a modem, or can be connected to a communications server on the LAN. The modem, which may be internal or external, can be connected to system bus 506 via an appropriate port interface. In a networked environment, application programs 534 or program data 538 depicted relative to computer system 500, or portions thereof, may be stored in a remote memory storage device 554.

Although this disclosure includes a detailed description on a computing platform and/or computer, implementation of the teachings recited herein are not limited to only such computing platforms. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models (e.g., software as a service (SaaS, platform as a service (PaaS), and/or infrastructure as a service (IaaS)) and at least four deployment models (e.g., private cloud, community cloud, public cloud, and/or hybrid cloud). A cloud computing environment can be service oriented with a focus on statelessness, low coupling, modularity, and semantic interoperability.

Figure 6:
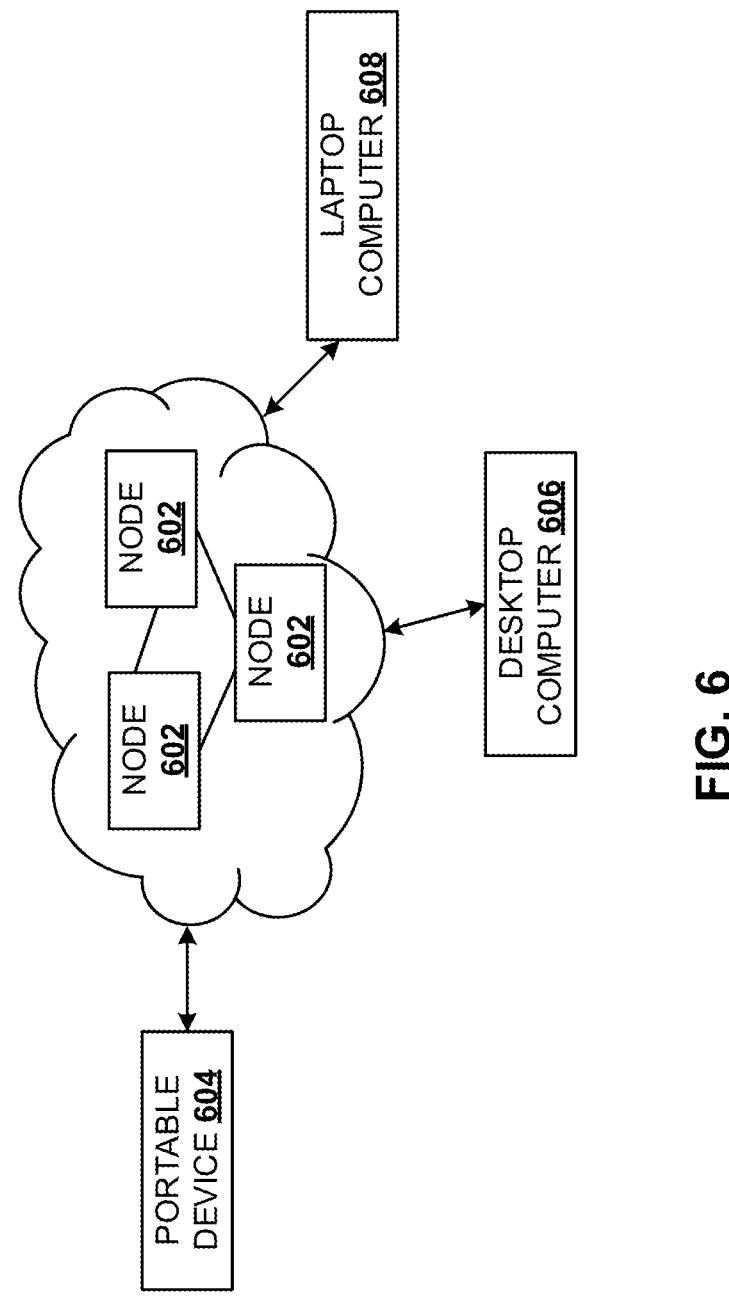
FIG. 6 depicts a cloud computing environment that can be used to perform one or more actions according to an aspect of the present disclosure.

FIG. 6 is an example of a cloud computing environment 600 that can be used for implementing one or more modules and/or systems in accordance with one or more examples, as disclosed herein. Thus, reference can be made to one or more examples of FIGS. 1-5 in the example of FIG. 6. As shown, cloud computing environment 600 can include one or more cloud computing nodes 602 with which local computing devices used by cloud consumers (or users), such as, for example, personal digital assistant (PDA), cellular, or portable device 604, a desktop computer 606, and/or a laptop computer 608, may communicate. In some examples, the cloud computing environment 600 can include a corporate network, as disclosed herein. Thus, the one or more nodes 602 can be used to implement the alarm receiver 126, as shown in FIG. 1. In some examples, the portable device 604, the desktop computer 606 or the laptop computer 608 is used to implement the alarm receiver 126.

The computing nodes 602 can communicate with one another. In some examples, the computing nodes 602 can be grouped (not shown) physically or virtually, in one or more networks, such as Private, Community, Public, or Hybrid clouds, or a combination thereof. This allows the cloud computing environment 600 to offer infrastructure, platforms and/or software as services for which a cloud consumer does not need to maintain resources on a local computing device. The devices 604-608, as shown in FIG. 6, are intended to be illustrative and that computing nodes 602 and cloud computing environment 600 can communicate with any type of computerized device over any type of network and/or network addressable connection (e.g., using a web browser). In some examples, the one or more computing nodes 602 are used for implementing one or more examples disclosed herein.

In some examples, the cloud computing environment 600 can provide one or more functional abstraction layers. It is be understood that the cloud computing environment 600 need not provide all of the one or more functional abstraction layers (and corresponding functions and/or components), as disclosed herein. For example, the cloud computing environment 600 can provide a hardware and software layer that can include hardware and software components. Examples of hardware components include: mainframes;

RISC (Reduced Instruction Set Computer) architecture based servers; servers; blade servers; storage devices; and networks and networking components. In some embodiments, software components include network application server software and database software.

In some examples, the cloud computing environment 600 can provide a virtualization layer that provides an abstraction layer from which the following examples of virtual entities may be provided: virtual servers; virtual storage; virtual networks, including virtual private networks; virtual applications and operating systems; and virtual clients. In some examples, the cloud computing environment 1900 can provide a management layer that can provide the functions described below. For example, the management layer can provide resource provisioning that can provide dynamic procurement of computing resources and other resources that are utilized to perform tasks within the cloud computing environment. The management layer can also provide metering and pricing to provide cost tracking as resources are utilized within the cloud computing environment 600, and billing or invoicing for consumption of these resources. In one example, these resources may include application software licenses. Security provides identity verification for cloud consumers and tasks, as well as protection for data and other resources. The management layer can also provide a user portal that provides access to the cloud computing environment 1900 for consumers and system administrators. The management layer can also provide service level management, which can provide cloud computing resource allocation and management such that required service levels are met. Service Level Agreement (SLA) planning and fulfillment can also be provided to provide pre-arrangement for, and procurement of, cloud computing resources for which a future requirement is anticipated in accordance with an SLA.

In some examples, the cloud computing environment 600 can provide a workloads layer that provides examples of functionality for which the cloud computing environment 600 may be utilized. Examples of workloads and functions which may be provided from this layer include: mapping and navigation; software development and lifecycle management; virtual classroom education delivery; data analytics processing; and transaction processing. Various embodiments of the present disclosure can utilize the cloud computing environment 600.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The term "based on" means "based at least in part on." The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 5-10% of the indicated number.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The term "based on" means "based at least in part on." The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 5-10% of the indicated number.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The present disclosure is also directed to the following exemplary embodiments, which can be practiced in any combination thereof:

Embodiment 1: a system comprising a data diode coupling a first network and a second network; an alarm transmitter coupled to the first network; an alarm receiver coupled to the second network, and wherein the alarm transmitter is operable to receive alarm data and communicate the alarm data by the data diode to the alarm receiver, and the alarm receiver is operable to output an alert based on the analysis of the alarm data.

Embodiment 2: the system of embodiment 1, wherein the alarm data is provided by a SCADA system coupled to the first network.

Embodiment 3: the system of embodiment 2, wherein the SCADA system is operable to store the alarm data in a first database and operational data in a second database.

Embodiment 4: the system of embodiment 3, wherein the alarm transmitter is operable to query the first database to receive the alarm data.

Embodiment 5: the system of any of the embodiments 1-4, wherein the alarm transmitter provides the alarm data as part of a spreadsheet, the spreadsheet being provided by the data diode to the alarm receiver.

Embodiment 6: the system of any of the embodiments 1-5, wherein the alarm transmitter includes a first interface to provide the alarm data, and the alarm receiver includes a second interface to receive the alarm data.

Embodiment 7: the system of embodiment 7, wherein the first and second interfaces are PI interfaces.

Embodiment 8: the system of any embodiments 6-7, wherein the second interface is a plurality of interfaces and the first network is a plurality of networks, and each interface of the plurality of interfaces is operable to receive respective alarm data provided by a corresponding alarm transmitter coupled to a respective network of the plurality of networks.

Embodiment 9: the system of embodiment 8, wherein the data diode is a plurality of data diodes, each data diode of the plurality of data diodes coupling a network of the plurality of networks to the second network.

Embodiment 10: the system of any of embodiments 1-9, wherein the alert is provided to a controller to cause the controller to initiate maintenance of a system.

Embodiment 11: the system of any of embodiment 10, wherein the system is one of an equipment, a tool, and a device of a pipeline network.

Embodiment 12: the system of any of embodiments 1-11, wherein the first network is one of a plant network and an HMD network and the second network is a corporate network.

Embodiment 13: the system of any of embodiments 1-12, wherein the alert is provided via one of an email and an SMS message to a device.

Embodiment 14: a method can include segregating, at a SCADA system, maintenance alarms and operational alarms into respective first and second databases, the SCADA system being coupled to a first network; configuring the first network with an alarm transmitter to provide one or more maintenance alarms of the maintenance alarms from the first database of the SCADA system; configuring a second network with an alarm receiver to receive the one or more maintenance alarms and output an alert based on the alarm data; and coupling the first network to the second network with a data diode, the data diode being used to provide the one or more maintenance alarms from the first network to the second network and block any data from being provided from the second network to the first network.

Embodiment 15: the method of embodiment 14, wherein said segregating of the maintenance and operational alarms is based on segregation criteria.

Embodiment 16: the method of any of the embodiments 14-15, wherein the alarm transmitter comprises a third database for storing the one or more maintenance alarms.

Embodiment 17: the method of any of the embodiments 14-16, wherein the alarm transmitter provides the one or more maintenance alarms to the alarm receiver according to a reporting schedule.

Embodiment 18: the method of any of the embodiments 14-17, further comprising causing the alert to be provided via one of an email and an SMS message to a device.

Embodiment 19: a system comprising a first computing platform coupled to a SCADA system on a first network to receive alarm data from an alarm database; and a second computing platform on a second network, the first network being coupled to the second network by a data diode so that the first computing platform can communicate the alarm data to the second computing platform to cause the second computing platform to provide an alert.

Embodiment 20: the system of embodiment 19, wherein the first and second networks have first and second firewalls respectively, the first firewall being configured to provide the alarm data to the data diode and the second firewall being configured to receive the alarm data for delivery to the second computing platform.

The invention claimed is:

1. A system comprising:
a data diode coupling a first network and a second network;
a Supervisory Control and Data Acquisition (SCADA) system coupled to the first network, wherein the SCADA system is operable to store alarm data from maintenance alarms in a first database and operational data from operational alarms in a second database;
an alarm transmitter coupled to the first network and operable to query the first database to receive the alarm data;
an alarm receiver coupled to the second network, and wherein
the alarm transmitter is operable to receive the alarm data and communicate the alarm data by the data diode to the alarm receiver, and
the alarm receiver is operable to output an alert based on analysis of the alarm data.

2. The system of claim 1, wherein the alarm transmitter provides the alarm data as part of a spreadsheet, the spreadsheet being provided by the data diode to the alarm receiver.

3. The system of claim 1, wherein the alarm transmitter includes a first interface to provide the alarm data, and the alarm receiver includes a second interface to receive the alarm data.

4. The system of claim 3, wherein the first and second interfaces are plant information (PI) interfaces.

5. The system of claim 4, wherein the second interface is a plurality of interfaces and the first network is a plurality of networks, and each interface of the plurality of interfaces is operable to receive respective alarm data provided by a corresponding alarm transmitter coupled to a respective network of the plurality of networks.

6. The system of claim 5, wherein the data diode is a plurality of data diodes, each data diode of the plurality of data diodes coupling a network of the plurality of networks to the second network.

7. The system of claim 1, wherein the alert is provided to a controller to cause the controller to initiate maintenance of pipeline network component.

8. The system of claim 7, wherein the pipeline network component is one of an equipment, a tool, and a device.

9. The system of claim 1, wherein the first network is one of a plant network and a hydrocarbon management network and the second network is a corporate network.

10. The system of claim 1, wherein the alert is provided via one of an email and a short message service (SMS) message to a device.

11. A method comprising:
segregating, at a Supervisory Control and Data Acquisition (SCADA) system, maintenance alarms and operational alarms into respective first and second databases, the SCADA system being coupled to a first network;
configuring the first network with an alarm transmitter coupled to the first network and operable to query the first database to receive one or more maintenance alarms of the maintenance alarms from the first database of the SCADA system;
configuring a second network with an alarm receiver to receive the one or more maintenance alarms from the alarm transmitter and output an alert based on the the received one or more maintenance alarms; and
coupling the first network to the second network with a data diode, the data diode being used to provide the one or more maintenance alarms from the first network to the second network and block any data from being provided from the second network to the first network.

12. The method of claim 11, wherein said segregating of the maintenance and operational alarms is based on segregation criteria.

13. The method of claim 12, wherein the alarm transmitter comprises a third database for storing the one or more maintenance alarms.

14. The method of claim 11, wherein the alarm transmitter provides the one or more maintenance alarms to the alarm receiver according to a reporting schedule.

15. The method of claim 11, further comprising causing the alert to be provided via one of an email and a short message service (SMS) message to a device.

16. A system comprising:
a first computing platform coupled to a Supervisory Control and Data Acquisition (SCADA) system on a first network, wherein the SCADA system is operable to store alarm data from maintenance alarms in an alarm database and operational data from operational alarms in an operational database, wherein the first computing platform is operable to query the alarm database and receive the alarm data from the alarm database; and a second computing platform on a second network, the first network being coupled to the second network by a data diode so that the first computing platform can communicate the alarm data to the second computing platform to cause the second computing platform to provide an alert based on the received alarm data, wherein each computing platform comprises:

one or more processors; and a non-transitory computer readable storage medium storing machine-readable instructions that when executed by the one or more processors cause the respective computing platform to perform the operations recited herein.

17. The system of claim 16, wherein the first and second networks have first and second firewalls respectively, the first firewall being configured to provide the alarm data to the data diode and the second firewall being configured to receive the alarm data for delivery to the second computing platform.

\* \* \* \* \*